Jan. 5, 1932.                F. SIGRIST                 1,839,349
               WING OF AEROPLANES AND THE LIKE AIRCRAFT
                    Filed May 27, 1929      2 Sheets-Sheet 1
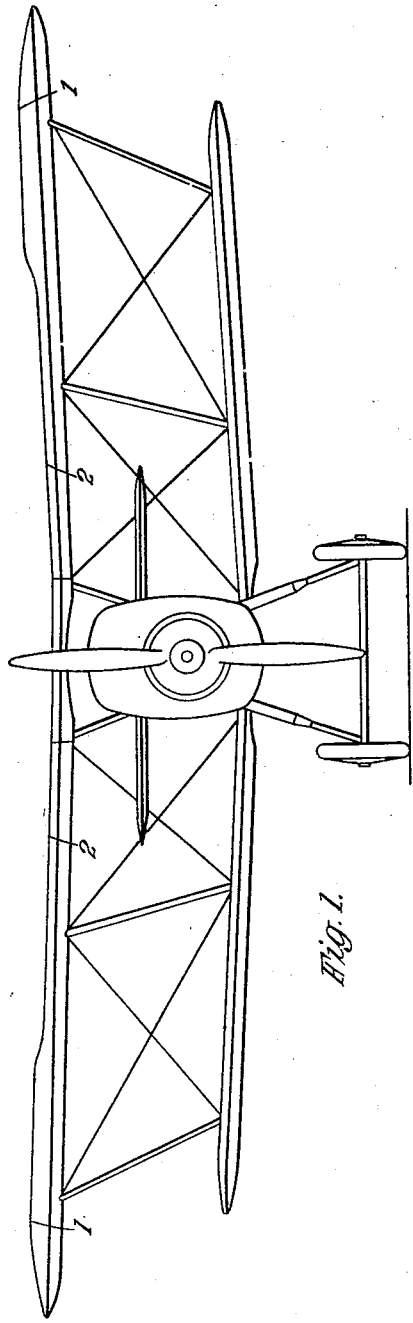
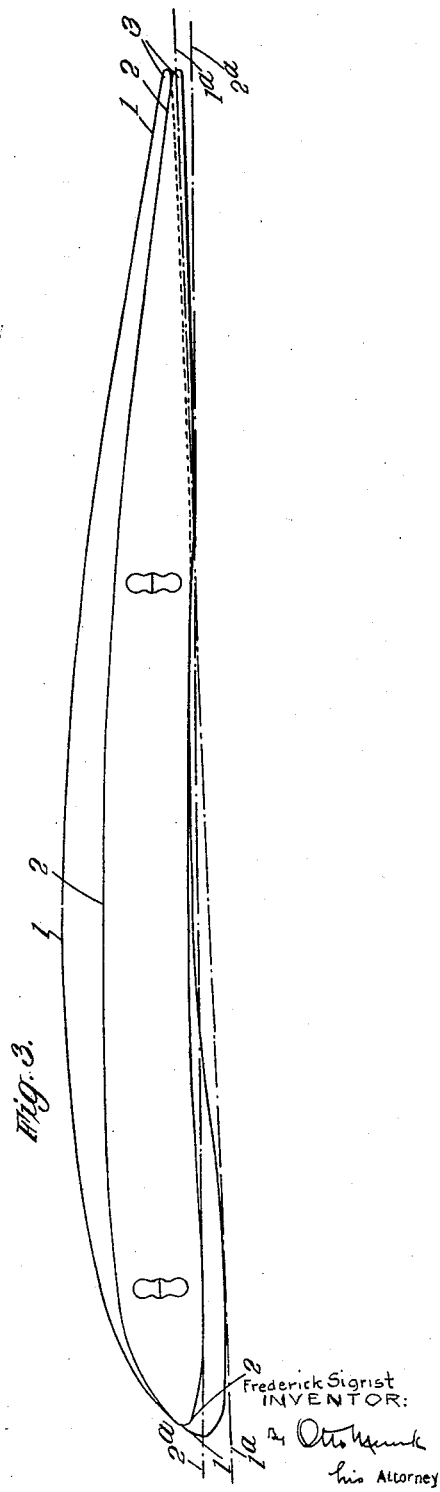
Frederick Sigrist
INVENTOR:
his Attorney

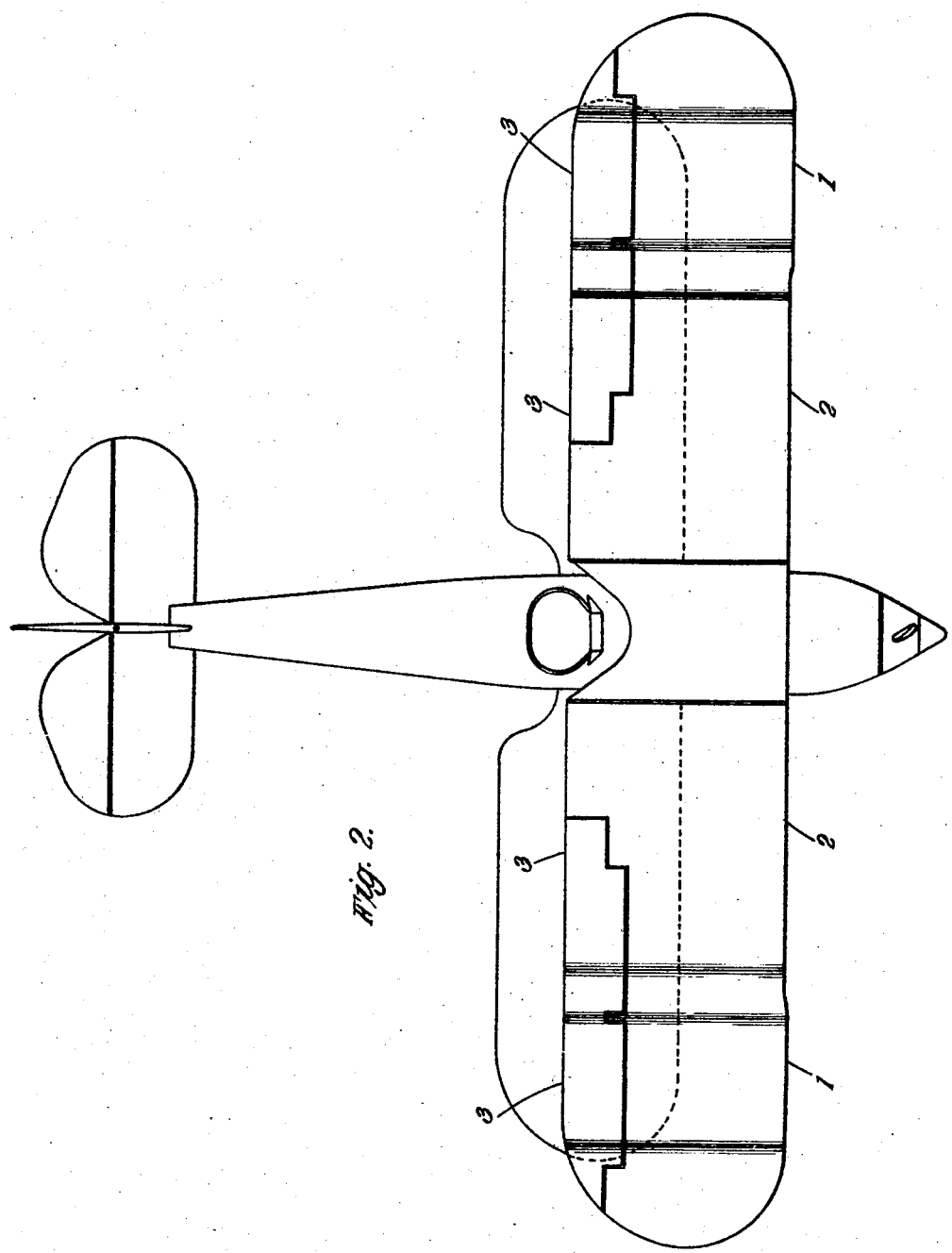

Patented Jan. 5, 1932

1,839,349

UNITED STATES PATENT OFFICE

FREDERICK SIGRIST, OF OXSHOTT, ENGLAND

WING OF AEROPLANES AND THE LIKE AIRCRAFT

Application filed May 27, 1929, Serial No. 366,208, and in Great Britain June 5, 1928.

This invention relates to the wings of aeroplanes and like aircraft and has for its primary object to obviate "stalling" and also to improve the stability and control of such craft.

When an aeroplane is flying in a circle, the inner wing is at a greater angle to the relative air than the outer wing, and this may result in the inner wing or the tip of the inner wing "stalling", while the outer wing is still lifting. In other words the inner wing or the tip of the inner wing may have passed the critical angle while the outer wing is still below the critical angle; thus causing the machine to get into a "spin".

The object of the present invention is to provide a construction for the wings of aeroplanes whereby the wings themselves, as structures, and apart from any movable controlling means, shall possess inherent capacity for obviating or reducing the liability to get into a "spin" as aforesaid when flying in a circle.

It is well known that a wing of "thick" section will give a higher lift co-efficient than one of "thin" section and also that the "stalling" angle of "thick" sections is greater than that of "thin" sections. Thus in the case of the "thin" wing section known as R. A. F. 28 the maximum absolute lift co-efficient is 0.47 and at larger angles the lift co-efficient falls away rapidly, whereas in such a "thick" wing section as that known as Goettingen 426 the absolute lift co-efficient at 12° is about 0.675 and this lift co-efficient remains practically constant from 12° to 21°. With other "thick" wing sections lift co-efficients of 0.75 can be readily obtained. Hence if a wing of "thin" section is provided with a tip of "thick" section the tip will not "stall" before the central portions of the wing even though the former may be at a greater angle to the relative air as aforesaid. Such wing tips may be "stepped" from or gradually "washed" into the wing.

The present invention therefore comprises an aeroplane or like aircraft wherein the tips, outer portions or zones have a later stalling angle than the inner portions, characterized by the fact that the said tips, outer portions or zones are of proportionally thicker wing section than the said inner portions.

The proportionally greater thickness of wing section may be obtained in two ways. Thus the distance from the front or leading edge to the rear or trailing edge (that is the chord) of the tips or outer portions may be the same or similar to that of the inner portion of the wing, and the actual thickness of the said tips or outer portions may be greater than the actual thickness of the inner portion. Or, the actual thickness of the said tips or outer portions might be the same as that of the inner portion, and the proportionally greater thickness obtained by making the chord of the said tips less than the chord of the inner portion.

In order to make the invention clear it will now be described with reference to the accompanying drawings wherein,—

Figure 1 is a front view of a biplane in which the upper wing is provided with wing tips of "thick" section.

Figure 2 is a plan of such machine.

Figure 3 is an end view of the wing showing the relative position of the "thin" and "thick" sections of the wings; and on a larger scale.

The upper wings of the biplane shown in Figures 1 and 2 are provided with tips of thickened section. The datum line 1a (Figure 3) for the thickened wing section of the wing tip 1 in this particular example is set at a negative angle of incidence with the datum line 2a of the normal wing section of the central portions 2 of the wing. The chord of the wing tips 1 is slightly greater than that of the central portion 2 so as to permit the two sections to be faired sweetly into each other without "reverse" surfaces, while the trailing edges 3 of both sections are in line.

In a modification the actual thickness of the wing may be maintained constant and the proportionally "thick" section may be obtained by making the wings of less actual width at the tips. Such tips may be tapered in plan so that the "thick" section merges gradually into the "thin" section, and such tips may be "washed" out to a negative angle or stepped out as a whole to the same negative angle.

I claim:—

1. Aeroplanes or like aircraft having wings of the same actual thickness of section throughout the span and outer portions of smaller dimensions from leading edge to trailing edge as compared with the inner portion to provide outer portions of proportionally thicker section than that of the section of the inner portion, substantially as described.

2. Aeroplanes or like aircraft having wings of the same actual thickness of section throughout the span and outer portions of smaller dimensions from leading edge to trailing edge as compared with the inner portion to provide outer portions of proportionally thicker section than that of the section of the inner portion, the said outer portions being tapered in plan whereby the proportional thickness of section increases gradually towards the wing tips, substantially as described.

3. Aeroplanes or like aircraft having wings of permanent wing section and wherein the outer portions, integral with the inner portion, are of proportionally thicker wing section than the wing section of the inner portion, substantially as described.

4. Aeroplanes or like aircraft having wings of permanent wing section and wherein the outer portions, integral with the inner portion, are of greater actual thickness of wing section than the wing section of the inner portion, substantially as described.

FREDERICK SIGRIST.